United States Patent [19]
Baughman et al.

[11] 3,923,622
[45] Dec. 2, 1975

[54] CYCLICALLY-BOUND LADDER POLYMERS OF CYCLIC DIACETYLENE TETRAMERS

[75] Inventors: Ray H. Baughman, Morris Plains; Kwok Chun Yee, Randolph, both of N.J.

[73] Assignee: Allied Chemical Corporation, New York, N.Y.

[22] Filed: Aug. 13, 1974

[21] Appl. No.: 497,027

[52] U.S. Cl. ...... 204/159.22; 260/93.1; 260/666 PY
[51] Int. Cl.² C08F 2/36; C08F 2/48; C08F 138/00
[58] Field of Search................ 204/159.22; 260/93.1, 666 PY; 450/735.5

[56] References Cited
OTHER PUBLICATIONS
Journal of the American Chemical Society, 81, 4600–4606 (1959).

Primary Examiner—Stanford M. Levin
Attorney, Agent, or Firm—Gerhard H. Fuchs; Arthur J. Plantamura; David W. Collins

[57] ABSTRACT

Cyclically-bound ladder polymers obtained from cyclic tetramers having the formula

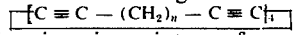

wherein n is an integer from 3 to 10. Polymerization proceeds by 1,4-addition reaction at each diacetylene group to produce four fully-conjugated chains joined together pairwise via a total of four $-(CH_2)_n-$ interchain linkages per 4.8A. polymer repeat length. Resulting from the particular crystal phases used as reaction matrices, these polymers are substantially free of unreacted diacetylene groups, as indicated by substantial absence of Raman vibration at about 2255 cm$^{-1}$, and are highly chain aligned.

8 Claims, 1 Drawing Figure

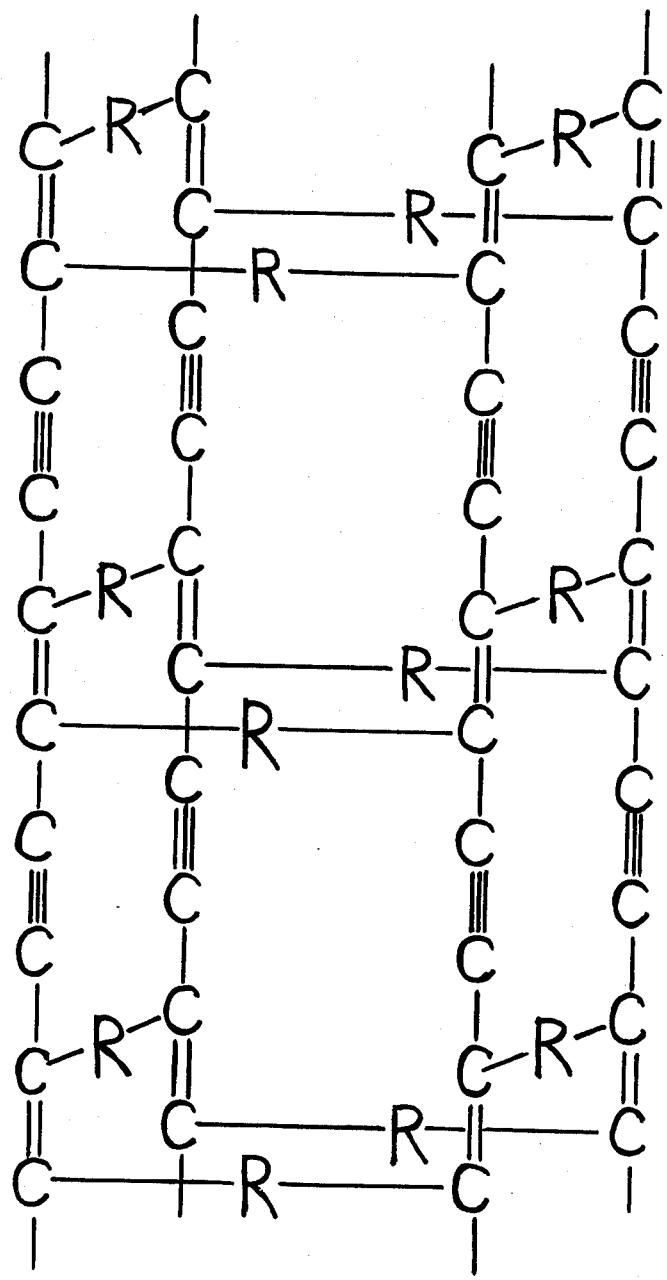
$$R = -(CH_2)_{\overline{n}}$$

CYCLICALLY-BOUND LADDER POLYMERS OF CYCLIC DIACETYLENE TETRAMERS

BACKGROUND OF THE INVENTION

Demand for plastics materials having high resistance to various modes of degradation has led to development of ladder polymers, so named because the schematic diagram of their molecular structure resembles a ladder. In polymers based on a linear polymer chain composed of single bonds, such as polyethylene, a break in the main polymer chain will reduce the number average molecular weight to half its original value, with concomitant decrease in properties dependent upon molecular weight, such as tensile strength and toughness. In ladder polymers, on the other hand, because they have a "double stranded" backbone chain, cleavage of any single bond within the chain will not result in decrease in molecular weight and resulting deterioration in properties. Two cleavages must occur in the same ring before a decrease in molecular weight occurs. If cleavages occur at random along the chain, many cleavages could result before two occurred in the same ring, leading to molecular weight degradation. Hence, ladder polymers ordinarily can be expected to be more resistant to mechanical, chemical and thermal degradation than their corresponding single chain counterparts. Since provision of two polymer chains in the backbone of a linear polymer thus improves its molecular weight dependent properties, provision of further backbone chains should be expected to further improve these properties.

Accordingly, it is an object of the present invention to provide ladder polymers having more than two, specifically four non-random cross-linked backbone chains. They are derived from known cyclic tetramers of certain terminal diacetylenes (cf., e.g., Sondheimer et al., *J. Amer. Chem. Soc.*, 81, 4600 (1959). While it has been known that certain large ring polyacetylenes undergo solid state polymerization upon exposure to light or upon thermal annealing, they have heretofore not been polymerized to form ladder polymers. In order to obtain the fully aligned ladder polymers of the present invention (rather than single strand polymers, irregularly cross-linked polymers, or polymers containing unreacted diacetylene groups) precursor crystal phases with ideally suited molecular packing are required.

BRIEF DESCRIPTION OF THE DRAWING

The drawing shows the structure of cyclically-bound ladder polymers of the present invention.

DESCRIPTION OF THE PRESENT INVENTION

In accordance with the present invention there are provided cyclically-bound ladder polymers of cyclic tetramers of terminal diacetylenes having the formula (I) below:

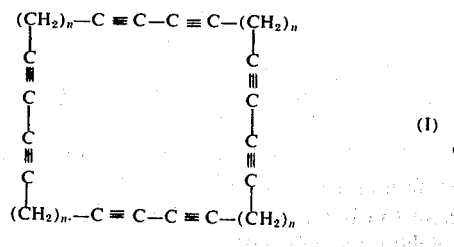

(I)

wherein $n$ is an integer of from 3 to 10. The backbone chain of these cyclically-bound ladder polymers of the present invention is schematically represented by the drawing which shows the four strands forming the polymer backbone chain which are formed by 1,4-addition polymerization of the diacetylene groups of the monomer, which backbone chains are cross-linked in regular intervals in "planes" along these chains. As a result of being "quadruple stranded", highly chain aligned, and regularly cross-linked, these polymers have exceptional stability and high tensile strength and modulus. Highly chain-aligned fibers of these polymers can be obtained with dimensions as large as are obtainable for the precursor monomer crystals—so they are readily obtainable several centimeters long.

The cyclically-bound ladder polymers of the present invention are prepared by solid state polymerization of the corresponding monomer following crystallization of the monomer from chloroform or mixtures of inert solvents with benzene or chloroform. Suitable inert solvents include petroleum ether, n-hexane, and n-heptane. We have surprisingly found that by crystallizing the monomer from chloroform or mixtures of benzene or chloroform with such inert solvents the monomers are obtained in crystal phases which permit their solid-state polymerization to form the cyclically-bound ladder polymers. It appears that on crystallization from chloroform or such solvent mixtures the monomer is obtained in crystal phases wherein the individual molecules are packed in stacked relationship, thus permitting solid-state 1,4-addition polymerization between adjacently "stacked" diacetylene groups in different molecules. We have found that for the monomer crystals obtained by crystallization from the chloroform or the above-mentioned solvent mixtures, the benzene and chloroform are incorporated interstitially into the respective crystal structures. These interstitial molecules are important insofar as they stabilize a crystal structure whose packing is suitable for the solid-state synthesis, but they are not chemically incorporated into either the monomer or polymer structures. From these crystals the cyclically-bound ladder polymers of the present invention are obtained by solid state polymerization by subjecting them to actinic radiation, heat or mechanical stress. It is essential that during polymerization the interstitially incorporated benzene or chloroform is still present in the crystal structure. Hence, the solid-state polymerization is preferably carried out under vapor pressure of benzene or chloroform sufficient to prevent evaporation of the interstitially incorporated benzene or chloroform. If the interstitially incorporated benzene or chloroform are permitted to evaporate from the monomer crystals, then upon subjecting the crystals to solid-state polymerization conditions, the cyclically-bound ladder polymers of the present invention are not obtained.

Cyclic tetramers of terminal diacetylenes suitable for making the cyclically-bound ladder polymers of the present invention are known compounds. They may be prepared by oxidative coupling of terminal diacetylenes having the formula

wherein $n$ has the aforestated meaning, as described by Sondheimer et al. *J. Amer. Chem. Soc.* 81, 4600

(1959). Briefly, the method described by Sondheimer et al. involves oxidative coupling of the $\alpha,\omega$-diacetylene with cupric acetate in pyridene, resulting in a mixture of cyclic dimer, trimer, tetramer, pentamer, hexamer, etc., followed by chromatographic separation of the product into the individual cyclic polyacetylenes.

Following separation of the desired tetramer and preparatory to subjecting it to solid-state polymerization, it must be crystallized from chloroform or mixtures of chloroform or benzene with one or more of the above-mentioned inert solvents, preferably petroleum ether. Crystallization may, for example, conventionally be effected by room temperature evaporation of solutions containing from 0.0001 to 0.1, preferably about 0.001 to 0.01 parts of monomer per part of solvent or solvent blend. In the solvent blend, benzene or chloroform should preferably be present at least in amount of about 25 percent by volume. The solvent blend should preferably contain no more than about 50 percent by volume of benzene.

Following separation of the monomer crystals from the mother liquor, they should be maintained under sufficient benzene or chloroform vapor pressure to prevent evaporation of the interstitially incorporated benzene or chloroform within the crystal structure. This may be conveniently accomplished by storing the crystallized monomer in closed vessels in the presence of liquid benzene or chloroform.

Solid state polymerization of the monomer crystals (with predominate needle habit) thus obtained containing interstitially incorporated benzene or chloroform may be effected by subjecting them to actinic radiation (visible wave length or shorter), heat or mechanical stress. Irradiation with ultraviolet light or $\gamma$-rays is a convenient method for effecting solid state polymerization. The resultant polymers are insoluble in common organic solvents, they are infusable and have practically the same shape as the precursor monomer crystals. They are strongly dichroic, with the axis of dichroism parallel to the polymer needle axis, indicating that the fully conjugated chains of the polymer are highly aligned, an aspect which is important for properties optimization. Their infra-red spectra are essentially identical to those of the monomer, indicating that the polymers possess the same functionality as the monomer. Raman spectral evidence indicates that 1,4-addition reaction has occurred at each of the four diacetylene groups within the monomer molecule. The Raman intense vibration at 2255 cm$^{-1}$, which is characteristic of the diacetylene functionality in the monomer, disappears during polymerization and is replaced by Raman intense vibrations at 2105 cm$^{-1}$ ($\nu_{C \equiv C}$) and 1490 cm$^{-1}$ ($\nu_{C=C}$) in the polymer, corresponding to the multiple bond vibrations from the conjugated chains [C$+$C$\equiv$C—C$]_n$ (see the drawing). This spectral evidence and diffraction results, which provide the expected 4.8 A chain repeat distance, confirm that solid-state polymerization has proceeded to form a cyclically-bound ladder polymer. Unless the monomer phase is identical with or analogous to the described phases, either the phase will be comparatively unreactive (so that no high polymer can be produced) or the polymer formed will be either irregularly cross-linked or contain unreacted diacetylene groups. These other polymers derived by solid-state polymerization of the same monomer do not have the advantageous properties of the polymers of the present invention. For the ladder polymer of the present invention to be obtained by solid-state polymerization, the mutually reacting diacetylene groups in neighboring monomer molecules must be related by a unit cell translation. Furthermore, for at least one of these diacetylene groups within the monomer molecule, there must exist a translationally related diacetylene group in a neighboring monomer molecule so that the center-to-center vector between these groups is in the range 3.8 to 8.3 A and preferably in the range 4.4 to 6.8 A. Furthermore, the inclination of the rods of these mutually reacting diacetylene groups with respect to this vector must be in the range 24° to 65° and preferably in the range 30° to 51°. Finally, to obtain the ladder polymers of the present invention the monomer molecules which react to form the polymer molecule must be stacked upon one another in the precursor monomer phase.

We further have found that the dimer, trimer and pentamer obtained by oxidative coupling of H—C$\equiv$C—(CH$_2$)$_4$—C$\equiv$C—H by the above-described method of Sondheimer et al. are not capable of undergoing solid-state polymerization in obtained crystal phases by the method of our invention to form cyclically-bound ladder polymers.

DESCRIPTION OF PREFERRED EMBODIMENTS

In formula I preferred embodiments are those wherein integer $n$ is from 3 to 8, more preferably 4 to 6. Most preferably in above-stated formula I, integer $n$ is 4.

The following example sets forth the best mode presently contemplated by us for the practice of our invention.

EXAMPLE

A. Preparation of the Monomer

To a 1,000 ml. three-necked round bottom flask fitted with mechanical stirrer, thermometer and reflux condensor, were added 75 grams (0.38 mol) cupric acetate monohydrate and 500 ml. of pyridene. The mixture was vigorously stirred, heated to 35°C. and 5.1 grams (0.047 mol) of 1,7-octadiyne was added. The resultant mixture was heated to 55° – 56°C. and stirred at that temperature for 3.5 hours. At the end of that time the mixture was cooled and then filtered to separate solids from liquids. Solids retained on the filter were twice washed with 100 ml. portions of benzene, the combined filtrates were allowed to stand at room temperature overnight, after which time the solvent was removed under reduced pressure. The residue was taken up in 300 ml. of benzene, and the benzene solution was washed with 200 ml. of water. Organic and aqueous layers were separated. The aqueous layer was extracted with two 300 ml. portions of ether. To the extracted aqueous layer there was added another 200 ml. portion of water, and the resultant mixture was extracted with one 200 ml. portion of ether. The combined ethereal extracts were washed twice with 150 ml. of 2N HCl, followed by two washings with 200 ml. portions each of water. The ethereal solution was dried over magnesium sulfate, followed by filtration to remove the magnesium sulfate and removal of the ether under reduced pressure to obtain 1.6 gram of a solid product comprising cyclic polyacetylenes.

B. Chromatographic Separation of the Cyclic Polyacetylenes

A chromatographic column of 48 centimeter length and 10.2 centimeter diameter was packed with 5 pounds of silica gel (Mallinckrodt CC-7) and n-hexane-toluene 3:1 as the solvent. All solvents used in the packing and eluting of the column were distilled before use. The column was washed with fresh solvent mixture for 2 days at a flow rate of 1 ml./min. before introduction of the sample. About 7 grams of product obtained by oxidative coupling of 1,7-octadiyne was dissolved in 275 ml. of benzene. N-hexane was added until a slight white precipitate formed, which was then taken up by adding toluene in amount sufficient to redissolve the precipitate. The sample solution was then added to the column feed at a rate of 2.5 ml./min., and fractions of the eluent were collected in 10 minute intervals. The column was run continuously and fractions were removed and worked up on daily basis. Over weekends the flow was reduced to 1 ml./min., and fractions were collected every 25 minutes. The table below summarizes the results of the chromatographic separation.

TABLE I

| Compounds | Volume ml | Weight gm | M. P. C° |
|---|---|---|---|
| Void* | 3150 | — | — |
| Dimer | 3420 | 0.2870 | 162° |
| Void | 3020 | — | — |
| Trimer | 5600 | 0.6213 | 167° |
| Void | 5500 | — | — |
| Tetramer | 11550 | 0.4837 | 152° |
| Void | 5250 | — | — |
| Mixture** | 6300 | 0.0666 | 130°–135° |
| Hexamer** or Heptamer | 9000 | 0.0745 | 162° |

*Void volume is volume between components
**Indicated by Thin Layer Chromatographic results The total material recovered from the column was 1.5 grams, representing about 22 percent of the material charged. The structure of the dimer and trimer were confirmed by mass spectrographic analysis. Structure of the tetramer was confirmed by mass spectrographic analysis of the fully hydrogenated compound as follows:

The cyclic tetramer, cyclodotriaconta-1,3,9,11,17,19,25,27-octayne thus obtained was recrystallized from 3:1 petroleum ether/chloroform. It was obtained in needle-like crystals which, upon exposure to daylight, rapidly turned pink. A sample of the cyclic tetramer was hydrogenated in dioxane, using 10 percent platinum on carbon catalyst to form the corresponding cyclic paraffin. Mass spectrographic analysis of the saturated cyclic paraffin thus obtained showed molecular weight of 448.0 in good agreement with calculated theoretical value of 448.5.

C. Solid-State Polymerization of the Solid Tetramer

The cyclic tetramer freshly recrystallized from petroleum ether/chloroform was subjected to irradiation with γ-rays for a 50 megarad exposure at 1 megarad per hour to obtain the polymer in the form of deep red-brown needles, insoluble in common organic solvents, infusable and having practically the same shape as the monomer crystal from which they were obtained. The polymer was highly dichroic, with the axis of dichroism parallel to the polymer needle axis. The infra-red spectrum analysis of the polymer was essentially the same as that of the monomer, indicating that the polymer possessed the same functionality as the monomer. Raman spectral analysis of the polymer crystals showed intensive vibrations at 2105 cm$^{-1}$ ($\nu_{C=C}$) and 1490 cm$^{-1}$ ($\nu_{C≡C}$) as contrasted with the Raman spectrum of the monomer, which shows an intense vibration at 2255 cm$^{-1}$ ($\nu_{C≡C}$). The polymer had the assigned cyclically-bound ladder structure as shown in the drawing.

The polymer as freshly prepared by irradiation of monomer which has been freshly recrystallized from petroleum ether/chloroform solvent blend still contains residual chloroform within its crystal structure. Thus, elemental analysis of such polymer indicated presence of about one molecule of chloroform per monomer unit. Elemental analysis of the polymer yielded the following results: C: 74.08 percent, H: 6.56 percent, Cl: 14 percent. Calculated composition for the polymer free of chloroform, $[(C_8H_8)_4]_x$ is C: 92.3 percent, H: 7.7 percent, and for polymer containing one molecule of chloroform per monomer unit, $[(C_8H_8)_4·CHCl_3]_x$ C: 73.97 percent, H: 6.16 percent, Cl: 19.86 percent. Also, the infra-red spectrum of the freshly prepared polymer showed fairly strong absorbtion in the region of 750 cm$^{-1}$ which is characteristic of C—Cl stretching vibration for chloroform. However, the chloroform is not chemically bound in either the monomer or polymer crystals.

X-ray diffraction confirmed that the polymeric needle fibers are single crystals. Thus, polymer of the present invention obtained in needle-like form of 1 to 2 centimeter length was confirmed to be of orthorhombic crystal structure with unit cell lattice parameters of $a = 12.4$ A, $b = 24.8$ A and $c = 4.8$ A, the c axis being the chain axis as well as the needle axis.

Since the polymers of the present invention have high strength, especially high tensile strength, they are eminently suitable for incorporation into composite structures to impart high strength thereto.

When other monomers within the purview of the present invention are subjected to irradiation, similar results are obtained, that is to say, high strength polymeric materials are formed.

Since varous changes and modifications may be made in carrying out our invention without departing from the spirit thereof, it is intended that all matter contained in the above description shall be interpreted as illustrative only, the invention being limited solely by the scope of the appended claims.

We claim:

1. Solid cyclically-bound ladder homopolymers of cyclic tetramers of terminal diacetylenes having the formula

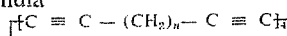

wherein $n$ is an integer of from 3 to 10, being substantially free of unreacted diacetylene groups as indicated by substantial absence of Raman vibration at about 2255 cm$^{-1}$.

2. Solid cyclically-bound ladder homopolymers according to claim 1 of cyclic tetramers of terminal diacetylenes having the formula

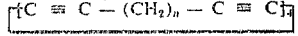

wherein $n$ is an integer of from 4 to 6.

3. Solid cyclically-bound ladder homopolymers according to claim 1 of cyclic tetramer of a terminal diacetylene having the formula

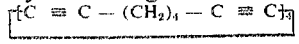

4. The method for making solid cyclically-bound ladder homopolymers according to claim 1 which comprises the steps of
   a. recrystallizing a cyclic tetramer of a terminal diacetylene having the formula
   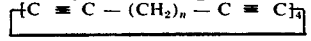
   wherein $n$ is an integer of from 3 to 10 from chloroform or mixtures of inert solvents with benzene or chloroform to obtain the cyclic tetramer as crystals with predominantly needle-like habit containing interstitially incorporated benzene or chloroform, and
   b. subjecting these crystals containing interstitially incorporated benzene or chloroform to actinic radiation, heat or mechanical stress to effect solid state polymerization.

5. The method of claim 4 wherein the cyclic tetramer is recrystallized from chloroform or mixtures of inert solvents with chloroform containing at least about 25 percent by volume of chloroform, and wherein solid-state polymerization is effected by subjecting the crystals of the monomer containing interstitially incorporated chloroform to actinic radiation.

6. The method of claim 5 wherein the cyclic tetramer of a terminal diacetylene has the formula
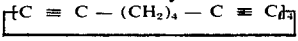

7. The method of claim 4 wherein the inert solvent is at least one selected from the group consisting of petroleum ether, n-hexane and n-heptane.

8. The method of claim 4 wherein a mixture of an inert solvent containing at least about 25 percent by volume of benzene or chloroform but less than 50 percent by volume of benzene is employed.

* * * * *